April 19, 1932. N. J. MEDVEDEFF 1,854,520
AIRCRAFT
Filed Oct. 7, 1930 4 Sheets-Sheet 1
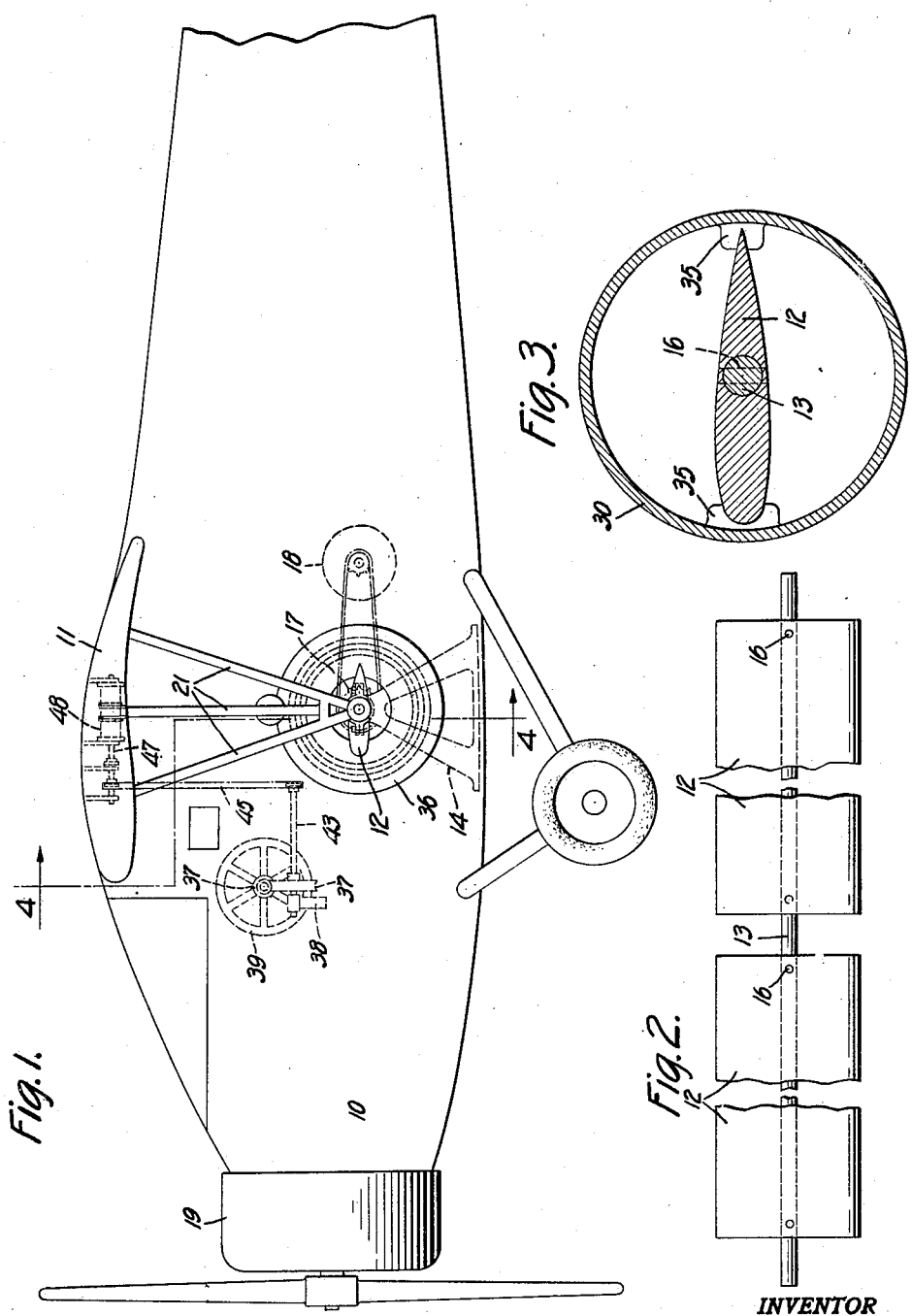
INVENTOR
Nicholas J. Medvedeff.
BY
ATTORNEYS April 19, 1932.  N. J. MEDVEDEFF  1,854,520
AIRCRAFT
Filed Oct. 7, 1930  4 Sheets-Sheet 2

INVENTOR
Nicholas J. Medvedeff
BY Moses & Nolte
ATTORNEYS

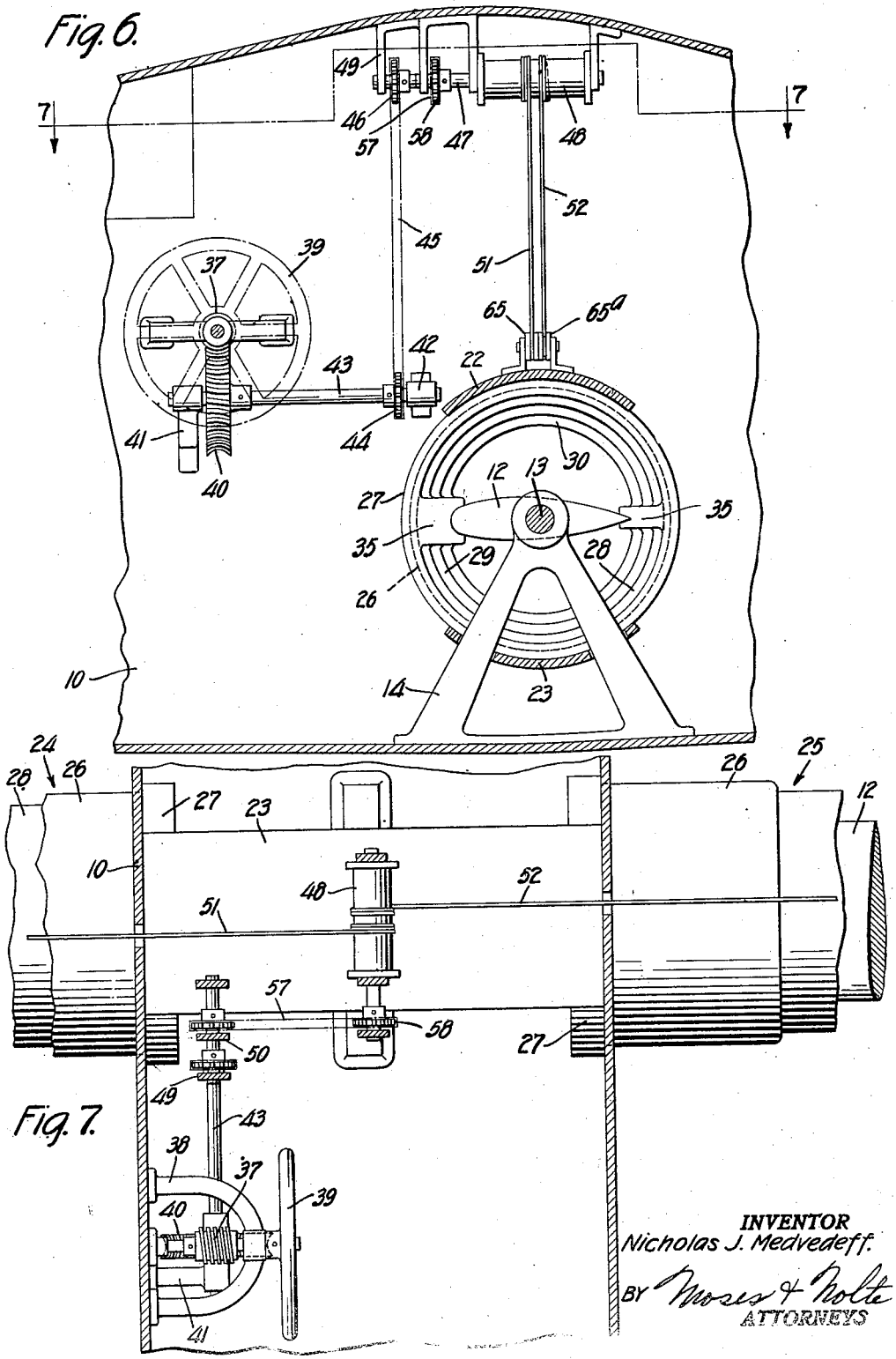

April 19, 1932. N. J. MEDVEDEFF 1,854,520
AIRCRAFT
Filed Oct. 7, 1930 4 Sheets-Sheet 4
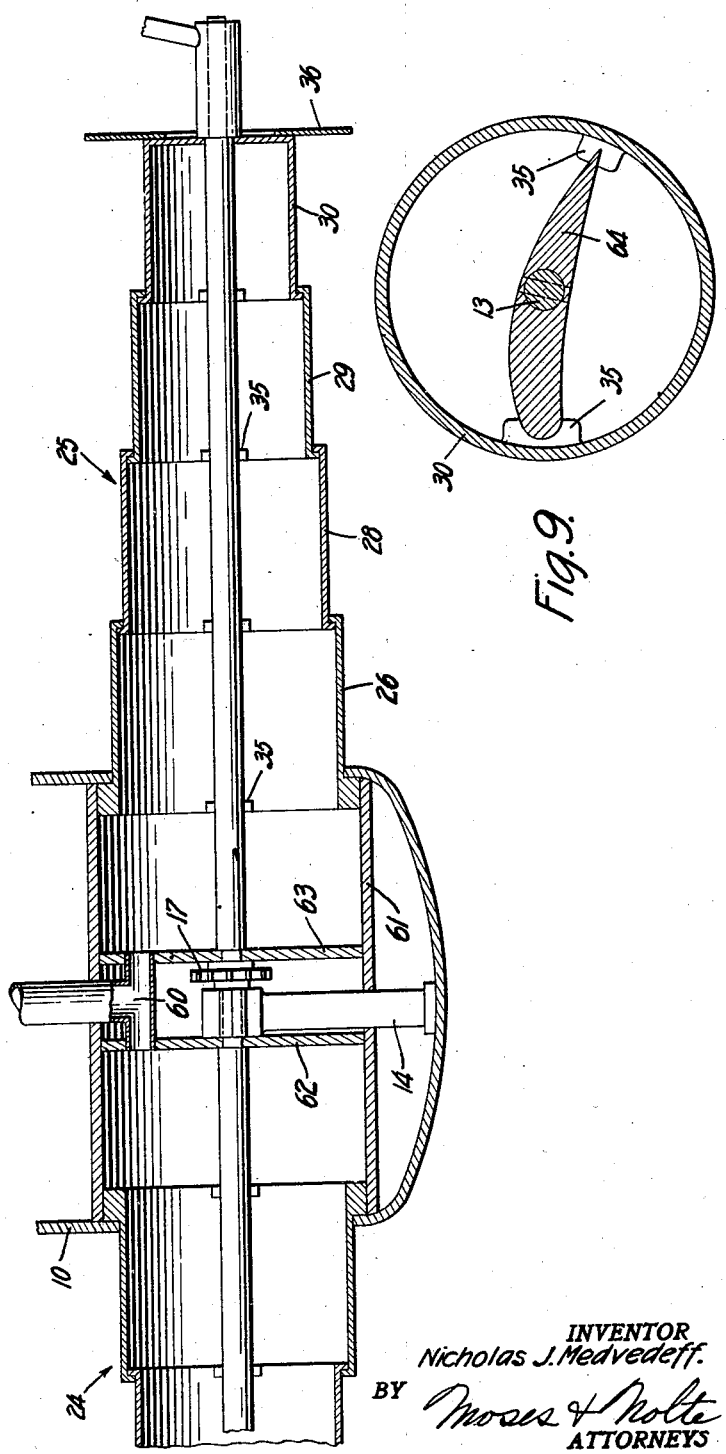
INVENTOR
Nicholas J. Medvedeff.
BY
ATTORNEYS Patented Apr. 19, 1932

1,854,520

UNITED STATES PATENT OFFICE

NICHOLAS J. MEDVEDEFF, OF SCARSDALE, NEW YORK

AIRCRAFT

Application filed October 7, 1930. Serial No. 486,884.

The present invention relates to aircraft in general and more particularly to heavier-than-air machines of the plane or wing type. The main object of the invention is to provide such machines with an arrangement of apparatus or devices which, independently of, or in cooperation with, the propelling means of the machine, facilitates the ascent or descent of the machine.

More particularly the object of the present invention is to provide an improved arrangement so that the aircraft may rise or ascend from the ground or from any level to any other desired level in a much shortened linear range. The same apparatus is, of course, employed for descending or landing with the same effect. Moreover, the devices being particularly useful during ascents and descents, it is frequently desirable to remove the effect of this apparatus during normal flight. For this reason, therefore, the present invention also comprehends apparatus of the type above described and provided with means whereby its effect during normal flight is minimized or entirely eliminated. For this purpose the present invention is in part directed to apparatus and devices for moving the lifting arrangement from its operative to its inoperative position and also for moving the same in the reverse direction, whether the plane be in flight or on the ground.

Reference is hereby made to my copending applications bearing the following serial numbers; 470,409; 472,545; and it will be apparent that features disclosed in the above mentioned copending applications may be embodied in an airplane embodying the subject matter of the present application and it will also be apparent that the features disclosed herein may be embodied in the aircraft disclosed in the above mentioned copending applications.

One of the objects of the present invention is to provide a novel type of rotor which may be moved from operative to inoperative position by collapsing the same into the interior of the fuselage. This object is preferably accomplished in the present embodiment of the invention by constructing the rotors in the form of a series of telescopic cylinders, which in normal flight are preferably housed within the airplane structure and which, when it is desired to ascend or descend, may be operated to their effective positions; means also being provided for collapsing cylinders or rotor sections within each other while in normal flight.

With these and various other objects in view, the invention consists in certain novel features of construction and in combinations and arrangements more fully and particularly set forth hereinafter and more fully and clearly disclosed in the drawings constituting a part of the present application; it being understood, however, that the drawings taken together with the specification submitted herewith are only illustrative of the invention and that modifications thereof, falling within the scope of the appended claims will be apparent to persons skilled in the art.

In the drawings:

Figure 1 is a side view of an aircraft embodying the preferred form of the invention;

Figure 2 is a plan view of the stream line bar carrying the rotors;

Figure 3 is a sectional view, taken on the line 3—3 of Figure 4, of one of the rotor sections showing the manner in which it is supported and carried by the bar;

Figure 6 is a partial sectional view taken upon line 6—6 of Figure 4;

Figure 7 is a sectional view taken on line 7—7 of Figure 6;

Figure 8 shows a modified form of the invention; and

Figure 9 shows a modified form of the rotor carrying bar in the form of an airfoil.

Figure 4:
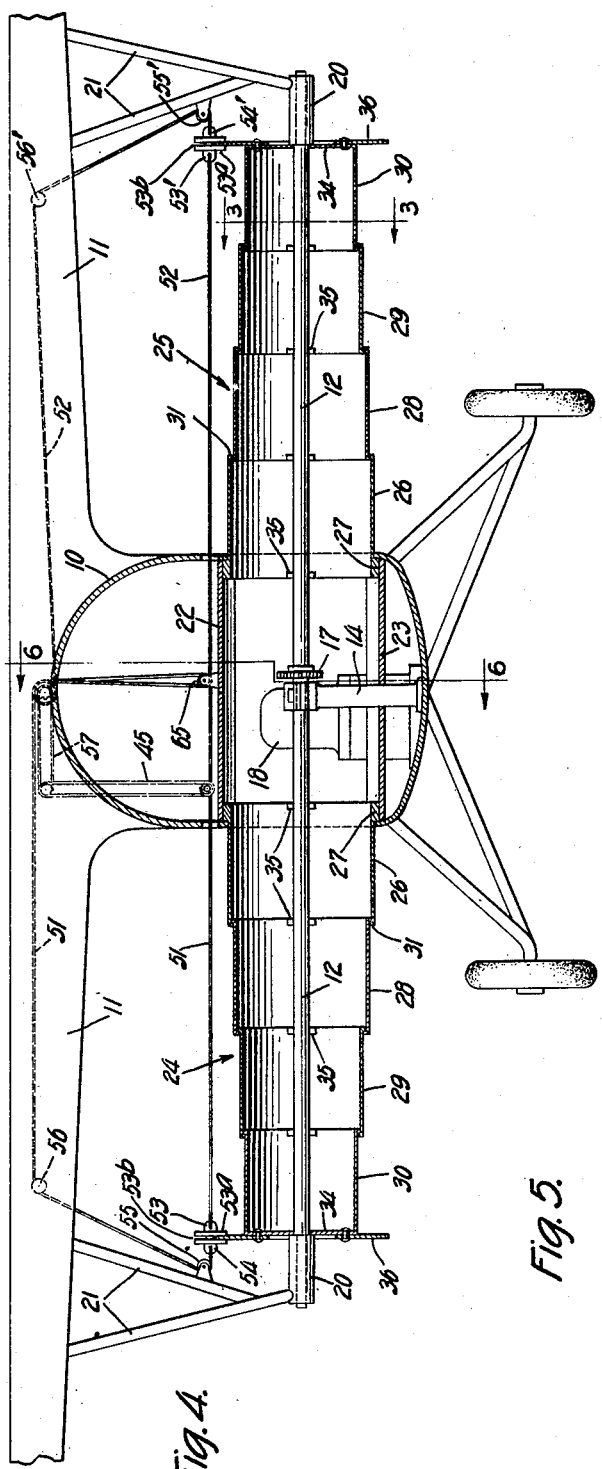
Figure 4 is a sectional view taken on line 4—4 of Figure 1 with the rotors shown in their extended or effective positions.

The present invention relates broadly to aircraft and to apparatus which is designed to utilize the Magnus effect to assist in the rising or landing of such aircraft or generally in ascents or descents of such aircraft so that such operations may be accomplished at very sharp angles which may perhaps approach the vertical.

More particularly the present invention relates to the employment of a pair of rotatable rotors which extend laterally from the fuselage or any part of the airplane where they can be conveniently carried, housed and operated, the rotors being rotated along the horizontal axis at a speed under the control of the pilot. The rotation of such rotors cooperates with air currents blowing in a direction at right angles to the axis of the cylinders to bring about a reaction which is effective upon the rotors along a line upward and rearward at an angle to the direction of the air current. While under some conditions the air currents existing in the ambient atmosphere may be employed for that purpose, in the case of airplanes, the air current created by the propeller is utilized to cooperate with the rotation of the cylinders to obtain the desired effect in the desired direction.

Referring to the drawings, the preferred form of the invention illustrated therein, is shown as embodied and applied to an aircraft of the monoplane type and comprising a fuselage 10 and a pair of wings 11. A stream line pair of bars 12 are carried by the rotatable shaft 13, the same being rotatably supported within the fuselage by the frame 14 and the bearing 15. The bars 12 are preferably made to rotate with the shaft 13 by means of the cross-pins 16. The shaft 13 is preferably provided with a sprocket wheel 17 so that power may be transmitted to the same to rotate the bars 12 and rotor cylinders when the same are put into their effective positions. 18 shows a motor of any suitable type housed within the fuselage and which may be utilized for rotating the airfoils 12, it being understood, however, that if desired the same may be rotated by the propeller motor 19.

The shaft 13 preferably projects beyond the front ends of the bars 12, as is shown in Figure 2, these ends being rotatably carried by journals 20 which are supported and carried by the strut structures 21 carried by the wings 11. The side walls of the fuselage are provided with circular openings and arcuate plates 22 and 23 are disposed between the side walls of the fuselage and immediately adjacent the openings therein but slightly spaced therefrom. These plates 22 and 23 serve as guides for the movement of the rotors 24 and 25.

Each of the rotors 24 and 25 consists of a series of telescoping cylindrical sections. For this purpose the sections 26 have an exterior diameter substantially equal to the openings in the side walls of the fuselage and are provided at their inner ends with exterior flanges 27 which may be made to slide within the arcuate guide plates 22 and 23 and which in the extended positions of the rotors 24 and 25 abut the inner face of the side walls of the fuselage. The outer end of each section 26 is provided with an inturned flange 31. Each succeeding section, of which there may be as many as desired, such as the sections 28, 29, and 30, are somewhat smaller in diameter than each preceding section and are similarly provided with outward flanges 32 at their inner ends and with inturned flanges 33 at their outer ends which cooperate with the corresponding flange of the adjacent section to permit of the ready expansion and collapse of the series of sections.

The end section 30 has its outer end closed by the wall 34 and which is provided with an opening of the same shape as the bar 12. The inner end of each section is additionally provided with a pair of inwardly projecting and suitably shaped guide lugs 35 which ride on the forward and rear edges of the bar 12. The engagement between the edges of the bars 12 and the lugs 35 is such, as will be seen in Figure 6, that the rotation of the shaft 13 and of the bar 12 therewith will also bring about the rotation of all of the sections of the rotors 24 and 25.

It will be seen from the above that when the rotors are in their extended or effective positions, the operation of the motor 18 will cause the rotation of the shaft 13, the airfoils 12 and of the rotors 24 and 25 by virtue of the engagement of the lugs 35 with the edges of the bar 12, and by virtue of the engagement of the wall 34 with the airfoil.

The end wall 34 of the outermost cylindrical section 30 is preferably provided with an outward annular flange 36 which is engaged to extend and collapse the rotors as hereinafter described, this flange 36 serving also the additional function of preventing the air from spilling off the ends of the rotors when the same are in operation.

Figure 5:
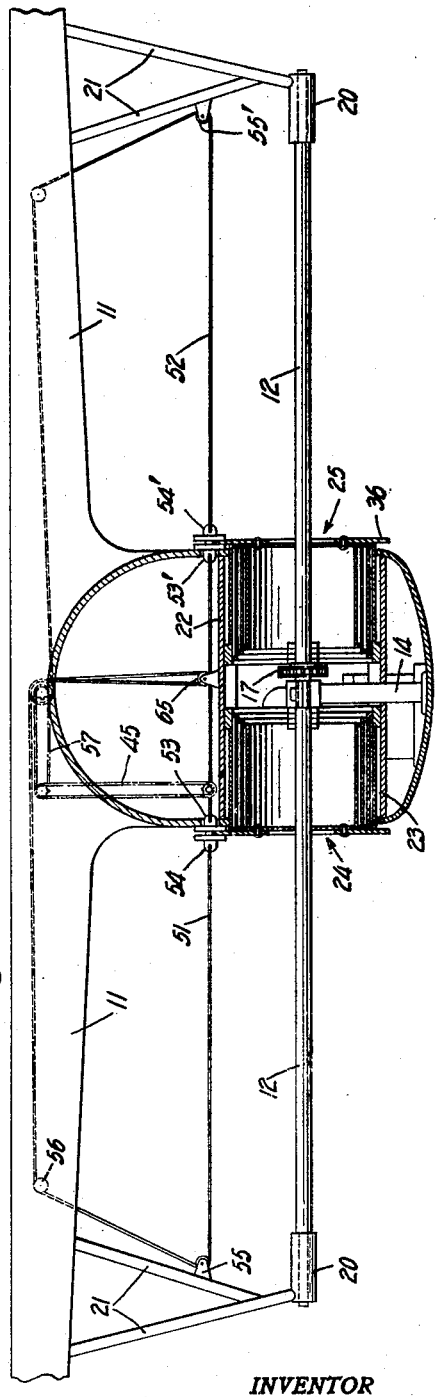
Figure 5 is a view similar to Figure 4 with the rotors shown in their collapsed positions.

The present invention also contemplates the provision of apparatus and devices under the control of the airplane operator for the movement of the rotors 24 and 25 from their collapsed position shown in Figure 5 to their extended or effective position shown in Figure 4, or in the reverse direction.

This apparatus comprises a worm 37 rotatably mounted in bracket 38, the worm being provided with a hand wheel 39 for the manual operation of the same in either direction or a motor may be provided for the operation of this worm. The worm wheel 40 engaging the worm 37 and rotatably supported by brackets 41 and 42 carries on its shaft 43 a sprocket wheel 44, the latter being connected by means of the sprocket chain 45 and sprocket wheel 46 to rotate the shaft 47 and the drum 48 carried thereby by means of the interposed sprocket chain 57 and sprocket wheel 58, the latter being carried by the shaft 47. The shaft 47 is preferably housed within the wing 11 and is carried therein by means of the brackets 49 and 50. By means of these devices the drum 48 may be rotated in one direction or the other. A pair of cables 51 and 52 are partially wound on the drum 48, the cable 51 being designed to operate the rotor 24 and the cable 52 being designed to operate the rotor 25. Each of these cables pass around pulleys 65 and 65a carried by the plate 22. The cable 51 passing around this pulley is connected at one end to the lug 53 of an element 53a having a groove 53b in which the plate 36 associated with the rotor 24 engages. The other end of the cable 51 is connected to the eye 54 disposed on the opposite face of the elements 53a. This second end of the cable 51 passes from the eye 54 around the guide pulley 55 carried by one of the struts 21 and thence over the guide pulley 56 and back to the drum 48.

Similarly the cable 52 is connected to the eye 53' on the element 53a' and the other end of the cable is connected to the eye 54' and then passes around guide pulleys 55' and 56' and back to the drum 48.

It will be seen, therefore, that as the hand wheel 39 is rotated in one direction the cables 51 and 52 will pull on the eyes 53 and 53' at the same time paying out the cable on the opposite side of the plate 36 thereby causing the collapse of the rotors. When the hand wheel 39 is rotated in the opposite direction, the cables serve to extend or project the rotors into their operative positions.

In order to permit of the rotation of the end sections 30 of the rotors and of the plate 36 associated therewith, the pairs of eyes 53 and 54 and 53' and 54' respectively are carried by the elements 53a and 53a' and the flanges 36 engage in the grooves 53b and 53b' to permit the free rotation of the plate 36.

Figure 8 shows a form of the invention which obviates the use of cables for projecting or collapsing the rotors, this being accomplished by means of air pressure to extend or project the rotors and by means of exhaust to collapse the same. For this purpose the T-pipe 60 is connected to the interior of the rotors, this pipe being connected to a pump (not shown) so that when it is desired to expand or project the rotors the air under pressure is caused to enter the rotors and when it is desired to collapse the same the pump is operated to exhaust the air from the interior of the cylinders, thereby subjecting the cylinders to atmospheric pressure which causes their collapse.

In this form of the invention guide plates 22 and 23 are replaced by a hermetically sealed cylinder 61, the same being interiorly divided by means of the walls 62 and 63. In this form of the invention each rotor forms, together with the corresponding chamber of the cylinder 61, a hermetically sealed interior in communication with the pipe 60. This obviates the use of cables. The manner in which Figure 8 may be combined with the other figures shown herein will be apparent to persons skilled in the art.

Figure 9 illustrates a modified form of the bar in the form of an airfoil 64 which may be used in lieu of the stream line bar 12 shown in the remaining figures.

Suitable means, not shown, may be provided to indicate to the pilot when the bar 12 or airfoil is in the most efficient position for flying after the rotors have been collapsed.

I have described what I believe to be the best embodiments of my invention. I do not wish, however, to be confined to the embodiments shown, but what I desire to cover by Letters Patent is set forth in the appended claims.

I claim:

1. In an aircraft, a structural body, a pair of wings, a pair of revoluble sustaining elements, one on each side of the structural body, means for rotating said sustaining elements, said elements being normally disposed interiorly of the structural body, and means for projecting the same outwardly from the structural body to effective position.

2. In an aircraft, a structural body, a pair of wings, a pair of revoluble sustaining elements, one on each side of the structural body, each comprising a series of telescopically collapsible cylindrical sections, means for rotating said sustaining elements, said elements being normally disposed interiorly of the structural body, and means for projecting the same outwardly from the structural body to effective position.

3. In an aircraft, a structural body, a pair of wings, a pair of revoluble sustaining elements, one on each side of the structural body, said elements being so constructed and arranged that the same may be collapsed to a position interiorly of the structural body, or projected to a position exteriorly of the structural body, and means for moving the same from one position to the other.

4. In an aircraft, a fuselage, a pair of wings carried by said fuselage, a shaft disposed transversely of said fuselage and extending exteriorly thereof, means for rotating said shaft, a pair of revoluble sustaining elements, one on each side of said fuselage carried by said shaft, said sustaining elements each comprising a series of telescopically collapsible and expansible cylindrical sections, and pneumatic means for moving these sustaining elements from collapsed to extended positions.

5. In an aircraft, a fuselage, a pair of wings carried by said fuselage, a shaft disposed transversely of said fuselage and extending exteriorly thereof, a bearing for each of the free ends of said shaft, struts carried by said wings supporting said bearings, means for rotating said shaft, a pair of revoluble sustaining elements, one on each side of said fuselage carried by said airfoil, said sustaining elements each comprising a series of telescopically collapsible and expansible cylindrical sections, and means for moving these sustaining elements from collapsed to extended positions.

6. In an aircraft, a fuselage, a pair of wings carried by said fuselage, a shaft disposed transversely of said fuselage and extending exteriorly thereof, a bearing for each of the free ends of said shaft, struts supporting said bearings, means for rotating said shaft, an airfoil carried by said shaft, a pair of revoluble sustaining elements, one on each side of said fuselage carried by said airfoil, said sustaining elements each comprising a series of telescopically collapsible and expansible cylindrical sections, and means for moving these sustaining elements from collapsed to extended positions.

7. In an aircraft, a structural body, a shaft disposed transversely of said structural body and extending exteriorly thereof, a bearing for each of the free ends of said shaft, struts supporting said bearings, means for rotating said shaft, an airfoil carried by said shaft, a pair of revoluble sustaining elements, one on each side of said structural body carried by said airfoil, said sustaining elements each being constructed and arranged that the same may be collapsed to a position interiorly of the structural body and projected to a position exteriorly of the structural body.

8. In an aircraft, a fuselage, a shaft disposed transversely of said fuselage and extending exteriorly thereof, a bearing for each of the free ends of said shaft, struts supporting said bearings, means for rotating said shaft, a pair of revoluble sustaining elements, one on each side of said fuselage carried by said shaft, said sustaining elements each being constructed and arranged that the same may be collapsed to a position interiorly of the fuselage and projected to a position exteriorly of the fuselage.

9. In an aircraft, a structural body, a cylindrical chamber disposed interiorly of the structural body and transversely thereof, a pair of revoluble sustaining elements normally disposed within said chamber in collapsed position and sealing said chamber, each of said elements comprising a series of telescoping hollow cylindrical sections, and pneumatic means for moving said elements from collapsed to extended positions.

In testimony whereof I have affixed my signature to this specification.

NICHOLAS J. MEDVEDEFF.